United States Patent

[11] 3,618,095

| [72] | Inventor | Sidney Darlington |
| | | Passaic Township, Morris County, N.J. |
| [21] | Appl. No. | 875,335 |
| [22] | Filed | Nov. 10, 1969 |
| [45] | Patented | Nov. 2, 1971 |
| [73] | Assignee | Bell Telephone Laboratories, Incorporated |
| | | Murray Hill, N.J. |

[54] AUTOMATIC EQUALIZER FOR CHIRP RADAR SYSTEM
9 Claims, 2 Drawing Figs.

[52] U.S. Cl............................................. 343/17.2 PC
[51] Int. Cl............................................. G01s 7/28
[50] Field of Search................................. 343/17.2 PC

[56] References Cited
UNITED STATES PATENTS
3,408,650  10/1968  Cook et al. .................. 343/17.2 PC Primary Examiner—T. H. Tubbesing
Attorneys—R. J. Guenther and William L. Keefauver ABSTRACT: In a Chirp radar system each dispersed signal pulse is diverted from the transmitter output power amplifier and antenna to the receiver where it is compressed by the receiver complementary dispersive line. The compressed pulse is processed, fed back to the transmitter dispersive line, and then conveyed to the transmitter output amplifier and antenna. By circulating and properly processing the pulse in the manner described, overall system distortions are substantially reduced.

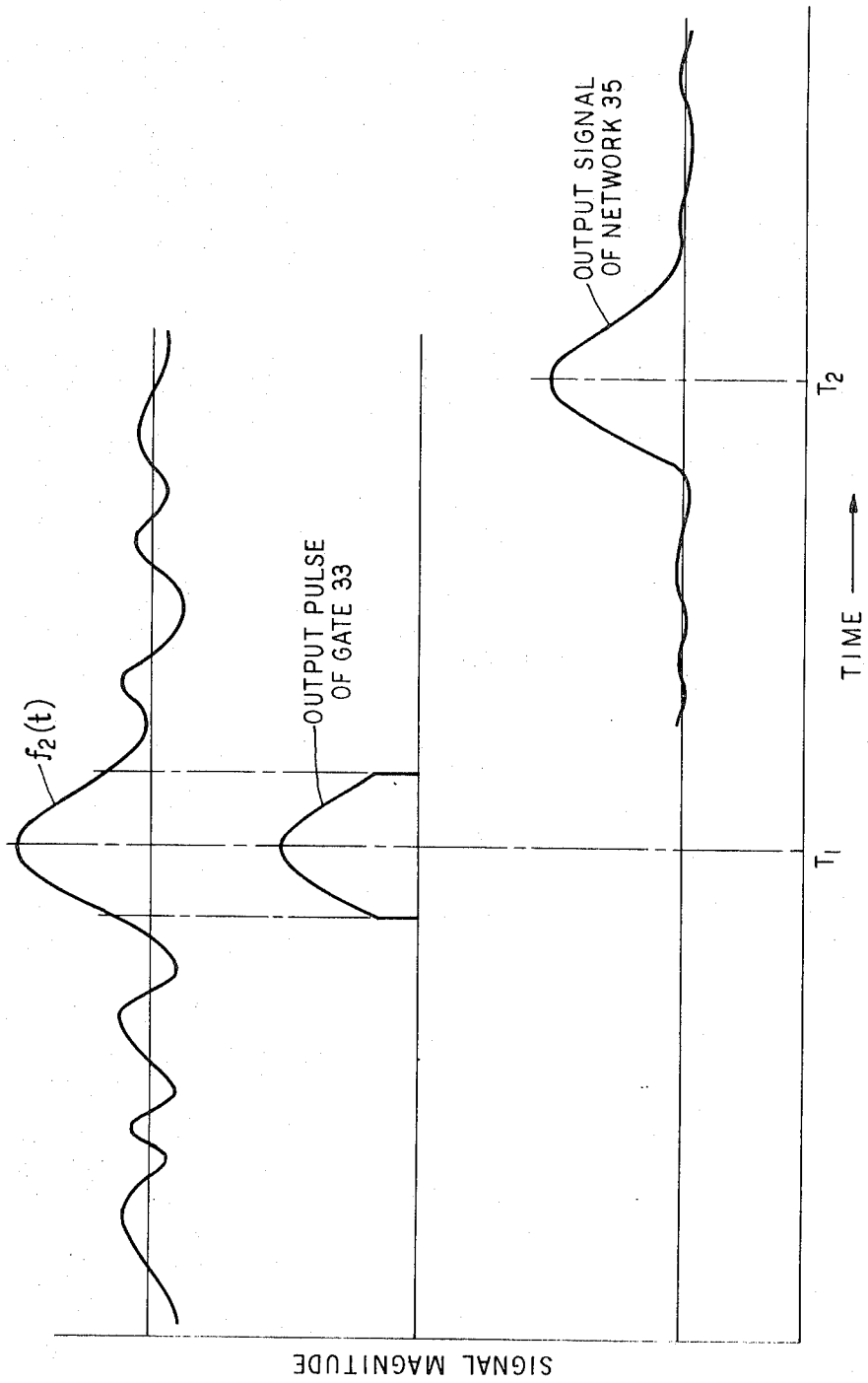

AUTOMATIC EQUALIZER FOR CHIRP RADAR SYSTEM

BACKGROUND OF THE INVENTION

1. Field of the Invention

This invention pertains to pulse compression radar systems and, more particularly, to apparatus for reducing distortion arising in such systems.

A pulse compression radar system, also known as a Chirp system, is described and its principles of operation explained in the article of which I am coauthor, entitled "The Theory and Design of Chirp Radars," J.R. Klauder et al., *Bell System Technical Journal*, pg. 745 Vol. 39 (July 1960). Briefly, a pulse compression radar system radiates a relatively low amplitude, long-duration, i.e., "stretched," pulse microwave signal, whose component signal frequencies are dispersed in a predetermined manner. The radiated frequency dispersed pulse is reflected from target objects and received by the radar system. In the receiver, the pulse is compressed into a relatively high amplitude, brief-duration pulse by a complementary pulse compressing dispersive line. Further discussion of the Chirp principle may be found in U.S. Pat. No. 2,678,997 issued to me on May 18, 1954.

In compressing the received Chirp pulse, one unfortunately introduces an undesirable feature, i.e., a plurality of spurious relatively low amplitude pulses appear about the desired single, relatively high amplitude, received pulse. By analogy with the familiar sidelobes of a directional antenna radiation pattern, the relatively low amplitude pulses, which precede and follow the desired high amplitude pulse, are referred to as sidelobes or "tails."

2. Description of the Prior Art

These spurious signals generally present undesirable ambiguities. Various techniques have thus been proposed for suppressing these unwanted components. For example, in the above cited Klauder article, a tapped delay line is utilized to develop a plurality of variously delayed compressed wavetrains, which are combined in a predetermined manner. Another technique is described in U.S. Pat. No. 3,281,842 wherein the transmitted dispersed pulse is frequency modulated by a multiplicity of phase-locked sinusoidal signals. By properly phasing each of the sinusoidal modulating signals, a reduction in the amplitudes of the undesired sidelobe signals is accomplished.

Apparatus incorporating either of the above techniques, or others used in the prior art, can be designed such that, theoretically at least, the undesired "tails" are small except in the vicinity of the main pulse. However, such apparatus is relatively complex, necessitating frequent adjustment and maintenance, and thus attendant increases in operating cost. More importantly, unavoidable imperfections in the actual apparatus lead to tails of a substantial magnitude over a long interval, frequently comparable to the length of the uncompressed pulse. These system imperfections thus place practical limitations on the magnitude of the pulse compression ratio and on the level to which the sidelobes or tails can be reduced.

It is therefore an object of this invention to substantially eliminate undesirable sidelobe signals, including sidelobes which are a result of unknown system imperfections, in a simple and economical manner.

SUMMARY OF THE INVENTION

In accordance with the principles of this invention, this and other objects are accomplished by diverting the frequency dispersed pulse, in a Chirp radar system transmitter, from the output amplifier and antenna and applying directly the diverted pulse to the receiver dispersive line wherein it is compressed. The compressed pulse is processed, in a manner to be described in detail hereinafter, and then fed back via the transmitter dispersive line to the transmitter output amplifier and antenna. By circulating and processing the pulse prior to transmission, overall system distortions are reduced to second order factors.

These and further features and objects of this invention, its nature and various advantages, will become more apparent upon consideration of the attached drawings and of the following detailed description of the drawings.

BRIEF DESCRIPTION OF THE DRAWINGS

FIG. 2 illustrates various waveforms present in the radar system of FIG. 1.

DETAILED DESCRIPTION

Figure 1:
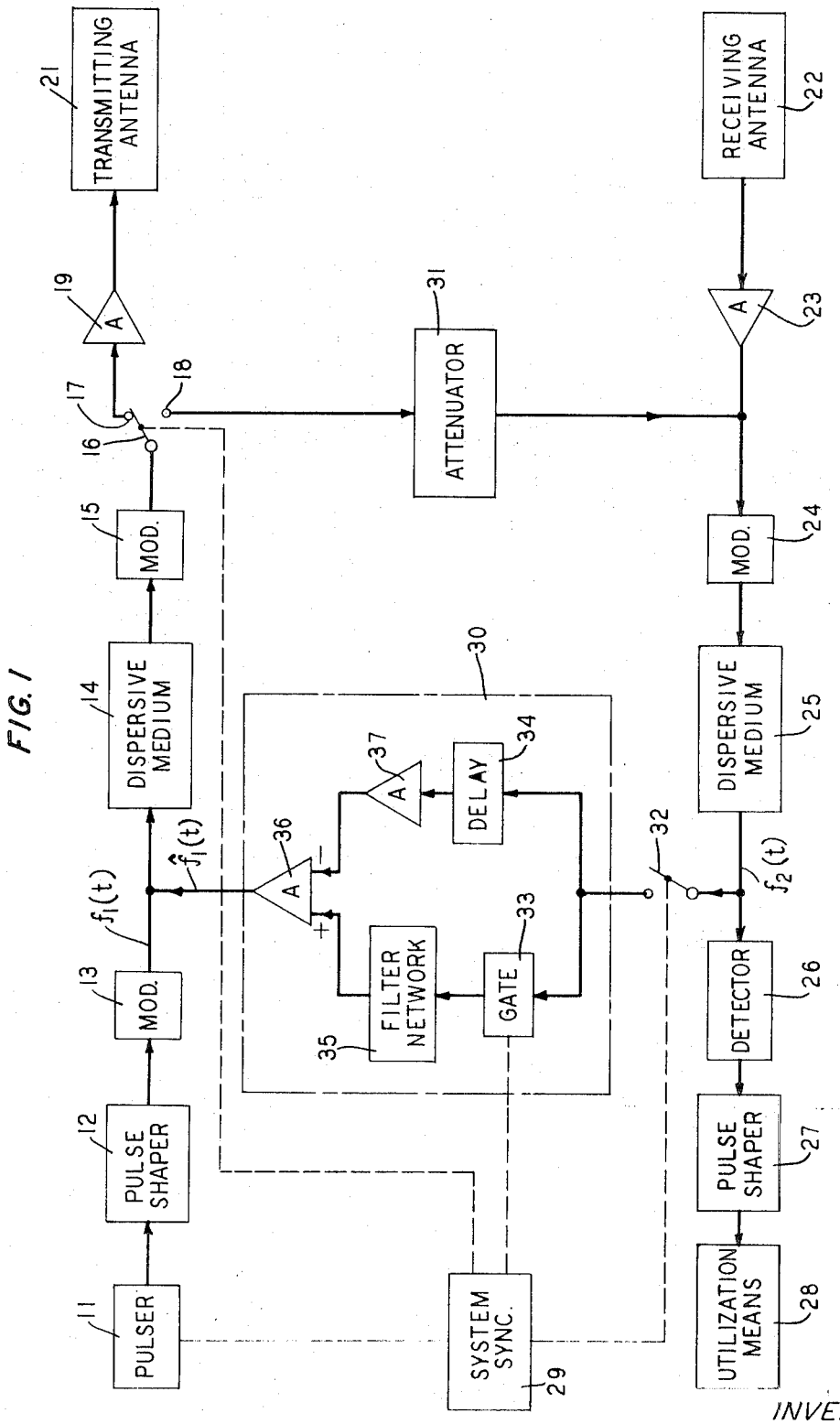
FIG. 1 is a block diagram of an illustrative pulse compression radar system in accordance with this invention.

FIG. 1 depicts a Chirp radar system wherein pulser 11, e.g., a pulsed microwave oscillator, develops a periodic train of pulses responsive to timing signals supplied by system synchronizer or timing control network 29, of any well-known type. Typical of the pulse trains used in radar systems, the train developed by pulser 11 is characterized by pulses of short duration relative to the time interval between pulses. Each pulse is "cleaned up" by pulse shaper 12 and modulated in apparatus 13 to develop an intermediate frequency (IF) pulse, $f_1(t)$, which is applied to Chirp dispersive line or network 14. In a manner well known to those skilled in the art, medium 14 "stretches" the applied pulse, i.e., disperses its frequency components in a predetermined manner. The frequency dispersed pulse emanating from line 14 is converted, in modulator 15, into a radio frequency (RF) pulse, Assuming that the movable contact of switch 16, which is preferably an electronic switch of any well-known type, is normally connected to terminal 17, the RF pulse is increased in magnitude by output power amplifier 19 and radiated into space by transmitting antenna 21. The radiated pulses are reflected from a target and received by antenna 22 and then amplified by apparatus 23. Modulator 24 converts the received amplified RF pulse into an IF pulse which is compressed by Chirp dispersive medium 25. Dispersive network 25, as is well known, has a characteristic complementary to the characteristic of transmitter dispersive line 14. The compressed pulse, $f_2(t)$, is envelope-detected by apparatus 26, "cleaned up" by pulse shaper 27 and conveyed to utilization means 28, e.g., a visual indicator.

The received compressed signal, $f_2(t)$, as depicted in FIG. 2, exhibits a high amplitude central lobe surrounded by low amplitude perturbations, i.e., sidelobes, introduced by imperfections in the system described. It will be recognized by those skilled in the art that the system, insofar as described is conventional.

In accordance with the principles of this invention, synchronizer 29 also actuates switches 16 and 32 upon the inititation of each pulse developed by pulser 11. Thus, a pulse appearing at the output of modulator 15 is diverted, via switch 16, to attenuator 31. Attenuator 31 is used, when necessary, to reduce the level of the RF pulse so as not to overload modulator 24. The attenuated pulse is conveyed via modulator 24, medium 25 and switch 32 to equalizer 30. Equalizer 30 processes the compressed signal, $f_2(t)$, to develop a predistorted signal $\hat{f}_1(t)$. The predistorted pulse is applied to network 14, modulator 15 and then to amplifier 19 and antenna 21 via deactivated switch 16. Switches 16 and 32, of course, are only activated for a period of time sufficient to complete the desired circulatory transmission path. Accordingly, each pulse first traverses the loop including equalizer 30 prior to radiation into space. Due to the relatively long time interval between pulses, sufficient time is available to circulate or propagate a pulse through equalizer 30 prior to the initiation of a succeeding pulse.

Turning now to a consideration of the operation of equalizer 30, the input signal $f_2(t)$ applied thereto may be expressed as follows:

$$f_2(t) = f_1(t-T_1) + s_1(t-T_1) \quad (1)$$

where $T_1$ is the transmission time or delay from the input of line 14 to the output of network 25 and $s_1$ represents the "- sidelobe" distortion introduced by imperfections in the system. The signal $f_2(t)$ is distorted, in a predetermined manner, by equalizer 30 to develop a new signal $\hat{f}_1(t)$ defined as follows:

$$\hat{f}_2(t) = f_1(t-T_2) - s_1(t-T_2) \quad (2)$$

where $T_2$ represents transmission time or delay. The imperfections in the linear system which altered $f_1(t)$ to $f_2(t)$ will alter $\hat{f}_1(t)$ to:

$$\hat{f}_2(t) = f_1(t-T_3) + s_1(t-T_3) - s_1(t-T_3) - s_2(t-T_3)$$
$$= f_1(t-T_3) - s_2(t-T_3) \quad (3)$$

where $s_2$ represents the further distortion of the original distortion component $s_1$ and $T_3$ represent transmission delay. The error component $s_1$ is a second order factor which is generally negligible in comparison to the other terms of the equation. Accordingly, the signal appearing at the output of receiver dispersive line 25, after the distorted signal $\hat{f}_1(t)$ is dispersed, transmitted and received from a target, is substantially free from distortion introduced by the system.

FIG. 2 illustrates the manner in which equalizer 30 develops the desired distorted IF pulse $\hat{f}_1(t)$. Conventional transmission circuit gate 33 of FIG. 1, responsive to timing signals developed by synchronizer 29, cuts off the tails, i.e., sidelobes of the pulse $f_2(t)$, but transmits the principal peak or central lobe. Gate 33 therefore develops an If pulse with a greater bandwidth than the the original pulse $\hat{f}_1(t)$. Pulse shaping filter network 35, of an well-known construction, alters the spectrum of the output signal of gate 33 to develop a signal, shown in FIG. 2, which is proportional to:

$$2 k f_1(t-T_2) \quad (4)$$

where $k$ is an arbitrary design constant and $T_2$ represents transmission delay. The signal $f_2(t)$, equals (1), is also delayed, in the other path of equalizer 30, by apparatus 34 and altered in magnitude by amplifier 37 to develop a signal which is proportional to:

$$k[f_1(t-T_2+s_1(t-T_2)] \quad (5)$$

Differential amplifier 36 develops a signal proportional to the difference between the signals emanating from network 35 and amplifier 37. It will be noted that the difference between these signals, defined by equations (4) and (5), is proportional to the desired pulse signal $\hat{f}_1(t)$ defined by equation (2).

It is to be understood that the embodiments shown and described herein are illustrative of the principles of this invention only, and that modifications of this invention may be implemented by those skilled in the art without departing from the scope and spirit of the invention; for example, gate 33 may be controlled by video output pulses of receiver pulse shaper 27. Further, gate 33 may be replaced by a threshold device which establishes a threshold above the amplitude level of the tails of the signal $f_2(t)$.

What is claimed is:
1. A Chirp radar system comprising:
   means for developing a train of input signal pulses;
   means for frequency dispersing said signal pulses;
   transmitter antenna means for radiating dispersed signal pulses;
   receiver antenna means for receiving radiated pulses;
   means for frequency compressing received pulses;
   first switching means for, upon actuation, diverting dispersed pulses from said transmitter antenna means to said frequency compressing means;
   equalizer means;
   second switching means for, upon actuation, conveying diverted pulses emanating from said frequency compressing means to said equalizer means;
   means for conveying output signals of said equalizer means to the input of said frequency dispersing means;
   and means for periodically actuating said first and said second switching means for a predetermined interval of time.

2. The Chirp radar system as defined in claim 1 wherein said equalizer means comprises;
   first means for developing a first signal proportional to a delayed replica of an input signal pulse;
   second means for developing a second signal proportional to a delayed replica of a frequency compressed pulse;
   and third means for combining algebraically said first and said second signals.

3. A pulse compression radar system comprising:
   transmitter means for frequency dispersing applied signal pulses;
   transmitter antenna means for radiating dispersed signal pulses;
   receiver means for frequency compressing received pulses;
   first switching means for, upon actuation, applying directly said dispersed pulses to said receiver frequency compressing means;
   equalizer means for distorting, in a predetermined manner, applied signal pulses;
   second switching means for, upon actuation, applying pulses emanating from said receiver frequency compressing means to said equalizer means;
   means for applying distorted output signals of said equalizer means to said transmitter frequency dispersing means;
   and means for periodically actuating said first and said second switching means.

4. A Chirp radar system comprising:
   transmitter means for frequency dispersing applied input signal pulses;
   transmitter antenna means for radiating dispersed signal pulses;
   receiver antenna means for receiving radiated pulses;
   receiver means for frequency compressing received signal pulses;
   first switching means connecting the output of said transmitter dispersing means, the input of said receiver compressing means and the input of said transmitter antenna means;
   equalizer means;
   second switching means connecting the output of said receiver signal compressing means to the input of said equalizer means;
   means connecting the output of said equalizer means to the input of said transmitter dispersing means;
   and means for actuating said first and second switching means to enable said dispersed applied signal pulses to circulate, prior to radiation by said transmitter antenna means, in the loop comprising said first switching means, said receiver compressing means, said second switching means, said equalizer means, and said transmitter dispersing means.

5. The Chirp radar system as defined in claim 4 wherein said equalizer means comprises:
   first means responsive to the output of said receiver signal compressing means for developing a first signal proportional to a delayed replica of an input signal pulse;
   second means responsive to the output of said receiver signal compressing means for developing a second signal proportional to a delayed replica of a frequency compressed signal pulse;
   and third means for combining said first and said second signals to develop a distorted replica of an input signal pulse.

6. A pulse compression radar system comprising:
   means for frequency dispersing applied signal pulses;
   means for transmitting said dispersed signal pulses;
   means for frequency compressing applied signal pulses;
   first switching means connecting said dispersing means, said compressing means, and said transmitting means;
   equalizer means;
   second switching means connecting the output of said compressing means to the input of said equalizer means;
   means for applying the output of said equalizer means to said dispersing means;

and means for actuating said first and second switching means to enable said dispersed signal pulses to propagate, prior to transmission, through said first switching means, said compressing means, said second switching means, said equalizer means, and said dispersing means.

7. In a Chirp radar system having a transmitter including a pulse generator for developing a train of pulse signals, means having an input and output for frequency dispersing said signal pulses, and an antenna having an input and output for radiating said dispersed pulses, and having a receiver including an antenna for receiving radiated pulses, and means having an input and output for frequency compressing received pulses, the improvement comprising:

first switching means for, upon actuation, disconnecting the input of said transmitter antenna means from the output of said frequency dispersive means and applying said dispersed pulses to the input of said frequency compressing means;

equalizer means;

second switching means for, upon actuation, applying pulses emanating from said frequency compressing means to said equalizer means;

means for conveying output signals of said equalizer means to the input of said frequency dispersing means;

and means for periodically actuating said first and second switching means at a rate equal to the pulse rate of said train of signal pulses and for a predetermined interval of time less than the interval of time between the pulses of said pulse train.

8. In a pulse compression radar system having means for frequency dispersing an applied signal pulse, an antenna for radiating said dispersed pulse, an antenna for receiving a radiated pulse, and means for frequency compressing a received pulse, the improvement comprising:

first switching means for, upon actuation, preventing radiation of said dispersed pulse and applying said dispersed pulse to said frequency compressing means;

equalizer means;

second switching means for, upon actuation, applying a pulse from said frequency compressing means to said equalizer means;

means for applying the output signal of said equalizer means to said frequency dispersing means;

and means for periodically actuating said first and second switching means.

9. The pulse compression radar system as defined in claim 8 wherein said equalizer means comprises means for generating a distorted delayed replica of said applied signal pulse.

* * * * *